(12) United States Patent
Xiang

(10) Patent No.: US 9,877,507 B2
(45) Date of Patent: Jan. 30, 2018

(54) ELECTRONIC CIGARETTE AND THE METHOD FOR DETECTING EXPIRATION DATE OF THE ELECTRONIC CIGARETTE

(71) Applicant: Zhiyong Xiang, Shenzhen (CN)

(72) Inventor: Zhiyong Xiang, Shenzhen (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 1257 days.

(21) Appl. No.: 13/900,011

(22) Filed: May 22, 2013

(65) Prior Publication Data

US 2014/0299138 A1    Oct. 9, 2014

(51) Int. Cl.
*A24F 47/00*     (2006.01)
*G06Q 10/00*    (2012.01)

(52) U.S. Cl.
CPC ........... *A24F 47/008* (2013.01); *G06Q 10/00* (2013.01)

(58) Field of Classification Search
CPC ............... A24F 47/008; G06Q 10/00
See application file for complete search history.

(56) References Cited

U.S. PATENT DOCUMENTS

2014/0230835 A1* 8/2014 Saliman ................ A24F 47/008
                                                                    131/329

* cited by examiner

*Primary Examiner* — Michael H Wilson
*Assistant Examiner* — Yana B Krinker
(74) *Attorney, Agent, or Firm* — Tim Tingkang Xia, Esq.; Locke Lord LLP

(57) ABSTRACT

An electronic cigarette and the method for detecting expiration date of the electronic cigarette is provided in the present invention; the electronic cigarette comprises: a power supply battery, a microcontroller connected and an atomizer connected with said power supply battery respectively; the microcontroller contains a first timing module, a comparison module and a control module; the first timing module is configured to timing; the comparison module is configured to compare said first timing module's timing period with a presetting period; the control module is configured to control the power supply module being disconnected with the atomizer when the comparison module's comparison result is that the timing period is equal to or greater than the presetting period. When an expiration date of an electronic cigarette is passed, the electronic cigarette will stop working and remind users.

2 Claims, 5 Drawing Sheets

ELECTRONIC CIGARETTE AND THE METHOD FOR DETECTING EXPIRATION DATE OF THE ELECTRONIC CIGARETTE

CROSS-REFERENCE TO RELATED APPLICATIONS

This non-provisional application claims priority under 35 U.S.C. §119(a) on Patent Application No. 201310117813.4 filed in P.R. China on Apr. 7, 2013, the entire contents of which are hereby incorporated by reference.

FIELD OF THE INVENTION

The present invention relates to the field of electronic conducts, and more particularly, relates to an electronic cigarette and the method for detecting expiration date of the electronic cigarette.

BACKGROUND OF THE INVENTION

An electronic cigarette, through heating and further atomizing its liquid smoke, is provided to smokers as a succedaneum of cigarette; and the electronic cigarette becomes more and more popular for smokers. At present, when users use electronic cigarettes, many users find that the taste of electronic cigarettes is changed. The cause is the electronic cigarettes are stored over their expiration date and the taste is becoming worse. Currently the production date and expiration date of the electronic cigarettes are only marked on their product packages or products, which make it harder to detect by user. When the electronic cigarettes being past their expiration date are inhaled, users can feel bad taste and the users' healthy may be affected.

SUMMARY OF THE INVENTION

To solve the drawbacks that electronic cigarette can't remind users according to the expiration date. The present invention provides an electronic cigarette and the method for detecting expiration date of the electronic cigarette.

The technical solutions of the present invention for solving the technical problems are as follows:

An electronic cigarette, comprising: a power supply battery, a microcontroller connected with said power supply battery and an atomizer connected with said power supply battery; wherein said microcontroller contains a first timing module, a comparison module and a control module;

said first timing module is configured to timing;

said comparison module is configured to compare said first timing module's timing period with a presetting period;

said control module is configured to control said power supply module being disconnected with said atomizer when said comparison module's comparison result is that said timing period is equal to or greater than said presetting period;

said presetting period is equal to a expiration date of said electronic cigarette; said presetting period is set and stored by said microcontroller.

Advantageously, wherein said first timing module is a calculagraph and its timing period is equal to said expiration date of said electronic cigarette.

Advantageously, wherein said first timing module is a timer and its timing period is equal to said expiration date of said electronic cigarette.

Advantageously, wherein said electronic cigarette further comprises a prompt module connected with said microcontroller; said prompt module is configured to output and display if said first timing module's timing period is passing said presetting period, and outputs reminding information to users when said comparison module's comparison result is that said timing period is equal to or greater than said presetting period.

Advantageously, wherein said reminding information is outputted from said prompt module by way of voice and/or display.

Advantageously, wherein said electronic cigarette further comprises a smoking sensor connected with said microcontroller and/or a input module connected with said microcontroller; said smoking sensor is configured to detect a smoking signal and transmit the signal to said microcontroller; said input module is configured to receive signals inputted from external then transmit the signals to said microcontroller;

if comparison result of the comparison module is that said first timing module's timing period is less than said presetting period, said microcontroller controls said power supply battery providing power to said atomizer according to the detecting signal from said smoking sensor or input signals from said input module;

If comparison result of comparison module is that said first timing module's timing period is equal to or greater than said presetting period, said microcontroller controls said power supply battery being disconnected with said atomizer.

Advantageously, wherein said input module is a key input module or a touch screen input module.

Advantageously, wherein said electronic cigarette further comprises a switch circuit configured to control said power supply battery being connected or disconnected with said atomizer; said switch circuit is a semiconductor switch.

Advantageously, wherein said microcontroller can be a MCU, a CPU, a GPU or an ASIC chip.

An electronic cigarette comprises: a power supply battery, a microcontroller and an atomizer connected with said power supply battery respectively; said electronic cigarette further comprises a second timing module which is respectively connected with said microcontroller and said power supply battery; said second timing module is configured to timing and transmitting the timing signals to said microcontroller;

said microcontroller contains a comparison module and a control module;

said comparison module is configured to compare said second timing module's timing period with said presetting period;

said control module is configured to control said power supply module being disconnected with said atomizer when said comparison module's comparison result is that said timing period is equal to or greater than said presetting period;

said presetting period is equal to a expiration date of said electronic cigarette; said presetting period is set and stored by said microcontroller.

Advantageously, wherein when said timing period is equal to or greater than said presetting period, said microcontroller controls said second timing module stopping timing.

Advantageously, wherein said second timing module is a calcuagraph chip with the type of RX8025.

Advantageously, wherein said microcontroller can be a MCU, a CPU, a GPU or an ASIC chip.

A method for detecting a expiration date of an electronic cigarette, said electronic cigarette comprises a microcontroller, a power supply battery connected with said microcontroller and an atomizer connected with said power supply battery; said microcontroller includes a first timing module, a comparison module and a control module; wherein said method comprising the steps of:

setting a presetting period according to said expiration date of said electronic cigarette;

beginning timing by said first timing module;

comparing said presetting period with said timing period from said first timing module by said comparison module;

when said timing period is equal to or greater than said presetting period, said control module of said microcontroller controls said power supply battery being disconnected with said atomizer.

Advantageously, wherein said method further comprises: when said first timing module's timing period is equal to or greater than said presetting period, said microcontroller controls said prompt module outputting reminding information to users; said reminding information is outputted by way of voice and/or display.

Advantageously, wherein said prompt module comprises a LED displayer and/or a speaker.

Advantageously, wherein said prompt module comprises a light-emitting diodes and/or a speaker.

A method for detecting an expiration date of an electronic cigarette, said electronic cigarette comprises a microcontroller, a power supply battery connected with said microcontroller, an atomizer connected with said power supply battery, a second timing module which is respectively connected with said microcontroller and said power supply battery; said microcontroller includes a comparison module and a control module; wherein, said method comprising the steps of:

setting a presetting period according to said expiration date of said electronic cigarette;

beginning timing by said second timing module;

obtaining said timing period from said second timing module by said microcontroller and comparing said presetting period with said timing period by said comparison module;

when said second timing module's timing period is equal to or greater than said presetting period, said control module of said microcontroller controls said power supply battery being disconnected with said atomizer.

Advantageously, wherein said method further comprises: when said second timing module's timing period is equal to or greater than said presetting period, said microcontroller controls said prompt module outputting reminding information to users; said reminding information is outputted by way of voice and/or display.

Implementing an electronic cigarette and a method of detecting expiration date of said electronic cigarette according to the present invention, and being applied to electronic cigarettes, especially disposable electronic cigarettes, the following advantageous effects can be achieved: when an electronic cigarette passes its expiration date, the electronic cigarette stops working and reminds it to users. It will let users obtain good taste and keep health when they are using electronic cigarette.

BRIEF DESCRIPTION OF THE DRAWINGS

The present invention will be further described with reference to the accompanying drawings and embodiments in the following, in the accompanying drawings.

DETAILED DESCRIPTION OF THE PREFERRED EMBODIMENT

The various features of the present invention will now be described with reference to the figures.

Figure 1:
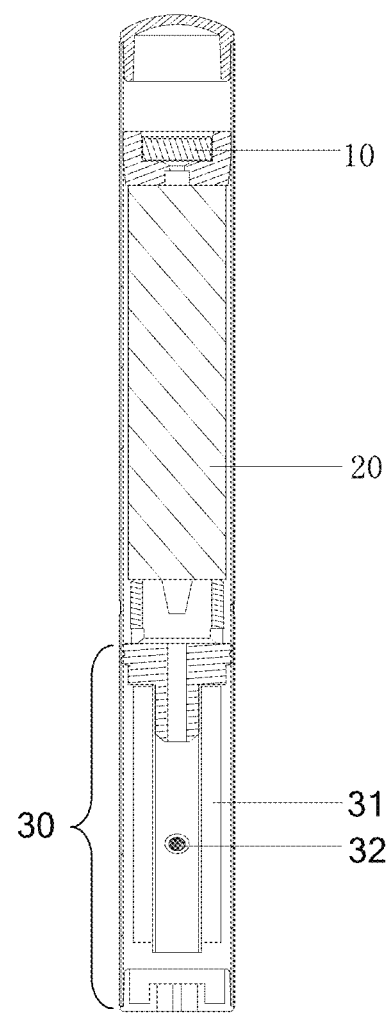
FIG. 1 is the structure diagram of an electronic cigarette in accordance with an embodiment of the present invention.

As FIG. 1 showing is the structure diagram of an electronic cigarette in accordance with an embodiment of the present invention.

In the embodiment of the present invention, an electronic cigarette comprises: a microcontroller 10, a power supply battery 20 and an atomizer 30. The microcontroller 10 can be a MCU, a CPU, a GPU or an ASIC chip. The microcontroller 10 is connected with the power supply battery 20. The atomizer 30 is connected with the power supply battery 20. The atomizer 30 includes oil storage cotton 31 and an electrically heated wire assembly 32. Wherein, liquid smoke is storage in the oil storage cotton 31. The working principle of the electronic cigarette is that the liquid smoke stored in the oil storage cotton 31 enters the atomizer 30, and the microcontroller 10 controls the power supply battery 20 to provide power to the atomizer 30, then the electrically heated wire assembly 32 begins to heat and further atomize the liquid smoke.

The liquid smoke in the electronic cigarette needs to be stored in the dark and cool dry place in order to avoid the liquid smoke going bad. However, the liquid smoke's expiration date is limited. It must be before the expiration date when using the electronic cigarette to ensure the taste of the liquid smoke. To disposable electronic cigarettes, liquid smoke can't be changed. So, if the liquid smoke is beyond expiration date, the taste will be worse and users' health will be influenced.

Figure 2:
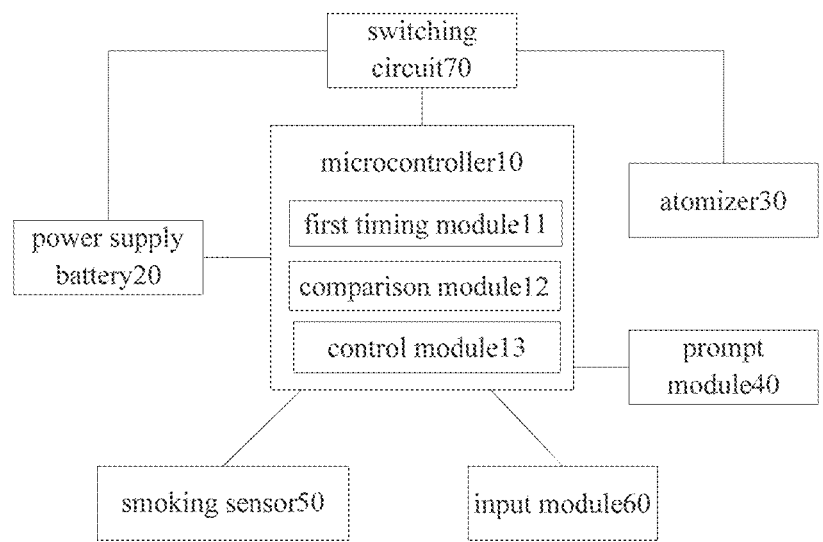
FIG. 2 is the structure diagram of an electronic cigarette in accordance with a first preferred embodiment of the present invention.

See FIG. 2, it is the structure diagram of an electronic cigarette in accordance with a first preferred embodiment of the present invention. In the first preferred embodiment of the present invention, a first timing module 11 is set in a microcontroller 10 to make an electronic cigarette has a reminding function for an expiration date. In the first preferred embodiment of the present invention, the electronic cigarette comprises: a microcontroller 10, a power supply battery 20, an atomizer 30, a prompt module 40, a smoking sensor 50, an input module 60 and a switching circuit 70. The prompt module 40 is connected with the microcontroller 10 and is configured to output and display reminding signals. The prompt module 40 includes a LED displayer and/or a speaker. The prompt module 40 may also include a Light-emitting diodes and/or a speaker. The smoking sensor 50 is connected with the microcontroller 10 and is configured to detect a smoking signal from external and then transmit the smoking signal to the microcontroller 10. The input module 60 is connected with the microcontroller 10 and is configured to receive inputted signals, and then transmit the inputted signals to the microcontroller 10. The input module 60 is a key input module or a touch screen input module. The switch circuit 70 is respectively connected with the microcontroller 10, the power supply battery 20 and the atomizer 30. The microcontroller 10 controls the switch circuit 70 being turned on or off to control the power supply battery 20 being connected with the atomizer 30 or disconnected with the atomizer 30. The switch circuit 70 is a semiconductor switch. The semiconductor switch can be a triode, MOSFTE, transistor or thyristor etc.

In the first preferred embodiment of the present invention, the microcontroller 10 includes a first timing module 11, a comparison module 12 and a control module 13. The first timing module 11 is configured to timing. A start timing time of the first timing module 11 is a time of an electronic cigarette production date or a time which user set. In the first preferred embodiment of the present invention, the first timing module 11 begins timing from the start timing time and continually counts a timing period, and finally stops timing until the timing period passing a expiration date of the electronic cigarette or a presetting period by user for the electronic cigarette, e.g., an electronic cigarette production time being Jan. 1, 2013, 17:00, then setting the first timing module 11's start timing time as Jan. 1, 2013, 17:00. Users can use the input module 60 to set the start timing time or stop timing time. The microcontroller 10 can receive inputted signals from the input module 60 and sets the start timing time and stop timing time for the first timing module 11.

The comparison module 12 is configured to compare the first timing module 11's timing period with the presetting period.

The control module 13 is configured to control the power supply module 20 being disconnected with the atomizer 30 when the first timing module 11's timing period is equal to or greater than the presetting period. If the timing period of the first timing module 11 is equal to or greater than the presetting period, the prompt module 40 outputs reminding information to users. The reminding information is outputted by way of voice and/or display.

In work condition, when the timing period of the first timing module 11 passed the presetting period, the control module 13 of the microcontroller 11 controls the switch circuit 70 being turned off so that the power supply module 20 can't provide power to the atomizer 30.

The first timing module 11 can be a calculagraph or a timer. The microcontroller 10 sets the presetting period being equaled to the expiration date and save the presetting period.

If the first timing module 11 is a calculagraph, the first timing module 11 adopts clockwise timing mode. The start timing time is a time of an electronic cigarette production date or a time which user set. A timing period begins from zero and continually counts the timing period, and finally stops timing, when the timing period is equal to or greater than expiration date of the electronic cigarette.

If the first timing module 11 is timer, it adopts countdown mode. The timer begins countdown from a period corresponding with the expiration date of the electronic cigarette or a period that uses set. When the timing period is to zero, timing is stopped.

In the first preferred embodiment of the present invention, users can set a start timing time through the input module 60. The microcontroller 10 sets the start timing time for the first timing module 11 according to the signals from the input module 60.

In the first preferred embodiment of the present invention, if the timing period of the first timing module 11 is less than the presetting period, the microcontroller 10 controls the switch circuit 70 being turned on, and the power supply battery 20 can provides power to the atomizer 30 according to the detecting signals from the smoking sensor 50 or input signals from the input module 60. If the first timing module 11's timing period is equal to or greater than the presetting period, the microcontroller 10 controls the switch circuit 70 being turned off, even if the microcontroller receives a detecting signal from the smoking sensor 50 or input signals from the input module 60, the power supply battery 20 can't provide power to the atomizer 30.

Figure 3:
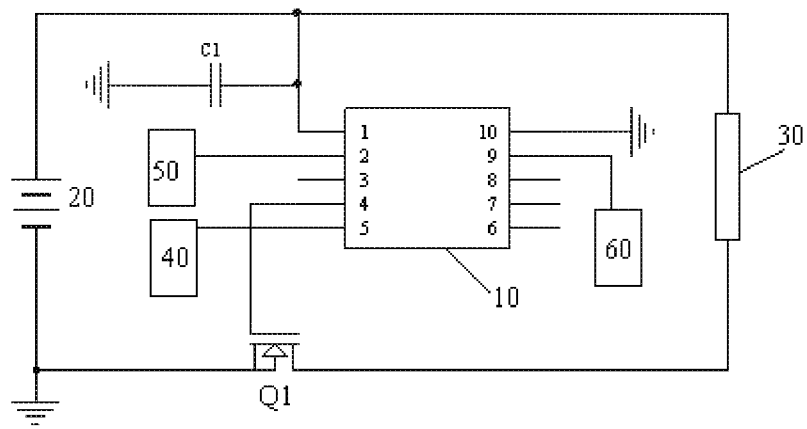
FIG. 3 is the circuit diagram of the electronic cigarette of FIG. 2 shows in accordance with a first preferred embodiment of the present invention.

FIG. 3 is a circuit diagram of the electronic cigarette of FIG. 2 shows in accordance with a first preferred embodiment of the present invention. In the first preferred embodiment of the present invention, the microcontroller 10 is a single-chip microcomputer with a type of Sn8P2711B, and other types of single-chip microcomputers or CPUs with similar function can also be selected. The switch circuit 70 includes a MOSFET Q1. A first pin of the single-chip microcomputer with a type of Sn8P2711B is VDD; a tenth pin is VSS; a second pin is P0.2/Xout; a third pin is P0.4/RST/Vpp; a fourth pin is P5.3/BZ1/PWM1; a fifth pin is P5.4/BZ0/PWM0; a sixth pin is P4.0/AIN0/AVrefH; a seventh pin is P4.1/AIN1; a eighth pin is P4.2/AIN2; a ninth pin is P4.4/AIN4.

The first pin of the microcontroller 10 is connected with the positive of the power supply battery 20 and connected with ground via a filter capacitor C1; the second pin is connected with the smoking sensor 50; the fourth pin is connected with the grid of the MOSFET Q1; the fifth pin is connected with the prompt module 40; the ninth pin is connected with the input module 60; the tenth pin is connected with ground.

The source of the MOSFET Q1 is connected with ground and the negative of the power supply battery 20; the drain of the MOSFET Q1 is connected with one end of the atomizer 30; the other end of the atomizer 30 is connected with the positive of the power supply battery 20.

In work condition, the timing period of the first timing module 11 of the microcontroller 10 is controlled by software. If the first timing module 11's timing period is less than the presetting period, that means the timing period has no passed the expiration date of the electronic cigarette, also when the second pin of the microcontroller 10 detects high voltage, which means the smoking sensor 50 detects smoke signal, or the ninth pin detects high voltage, which means the input module 60 detects input signals, and then the microcontroller 10 outputs a high voltage from its fourth pin. The MOSFET Q1 is turned on and the power supply battery 20 provides power to the atomizer 30. The atomizer 30 begins working.

If the first timing module 11's timing period is equal to or greater than the presetting period. The microcontroller 10 output a low voltage from its fourth pin. The MOSFET Q1 is turned off and the power supply battery 20 can't provide power to the atomizer 30. AT this moment even if the second pin of the microcontroller 10 detects high voltage or the ninth pin detects high voltage, the microcontroller 10 still outputs low voltage from its forth pin. The power supply battery 20 still can't provide power to the atomizer 30. Moreover, the microcontroller 10 outputs a signal from its fifth pin to make the prompt module 40 output reminding signals, therefore users know the expiration date of the electronic cigarette is passed. Reminding information is outputted by way of voice and/or display. When expiration date of an electronic cigarette is passed, the atomizer 30 stops working, i.e. the electronic cigarette stops working after passing its expiration date. Therefore it prevents users from using overdue electronic cigarettes.

Figure 4:
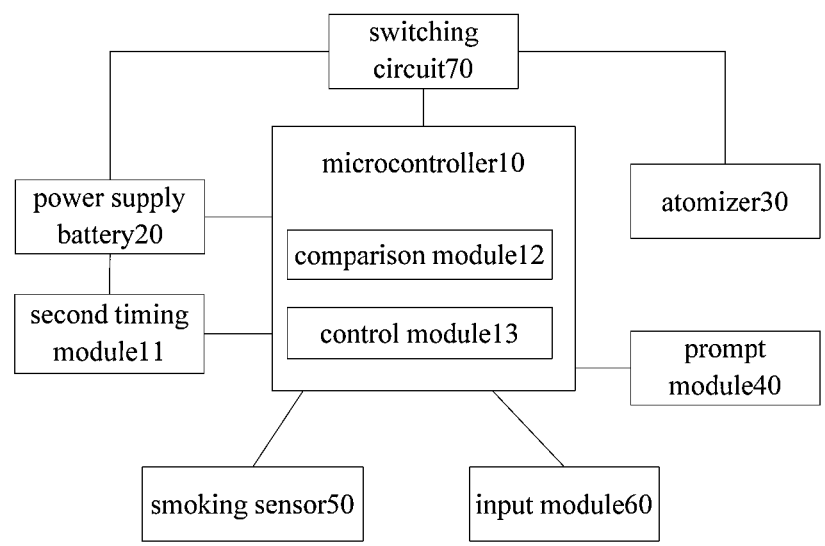
FIG. 4 is the structure diagram of an electronic cigarette in accordance with a second preferred embodiment of the present invention.

Referring to FIG. 4, it is a structure diagram of an electronic cigarette in accordance with a second preferred embodiment of the present invention. In the second preferred embodiment of the present invention, the electronic cigarette comprises: a microcontroller 10, a power supply battery 20, an atomizer 30, a prompt module 40, a smoking sensor 50, an input module 60, a switching circuit 70 and a second timing module 80. Wherein, the microcontroller 10, the power supply battery 20, the atomizer 30, the prompt module 40, the smoking sensor 50, the input module 60 and the switching circuit 70 are the same as the first preferred embodiment. The second timing module 80 is respectively connected with the microcontroller 10 and the power supply battery 20. The second timing module 80 is configured to timing and transmitting timing signals to the microcontroller 10. A start timing time of the second timing module 80' is a time of the electronic cigarette production date or a time which user sets. In the second preferred embodiment of the present invention, the second timing module 80 begins timing from the start timing time, continuously counts a timing period, and finally stop timing until the timing period passing a expiration date of the electronic cigarette or a presetting period by user for the electronic cigarette, Users can use the input module 60 to set the start timing time or a stop timing time. The microcontroller 10 can receive the inputted signals from the input module 60 and control the start timing time and stop timing time for the second timing module 80.

The microcontroller 10 includes a comparison module 12 and a control module 13. The comparison module 12 is configured to compare the second timing module 80's timing period with the presetting period. The control module 13 is configured to control the power supply module 20 being disconnected with the atomizer 30 when the second timing module 80's timing period is equal to or greater than the presetting period, At the same time the control module 13 controls the second timing module 80 stopping timing. The presetting period is equal to the expiration date of the electronic cigarette. The presetting period is set and saved by the microcontroller 10.

In the second preferred embodiment of the present invention, the second timing module 80 is a calcuagraph chip with a type of RX8025. It is powered by the power supply battery 20.

In work condition, the second timing module begins timing after receiving control signals from the microcontroller 10. When the second timing module's timing period is less than the presetting period and also the microcontroller 10 receives a detecting signal from the smoking sensor 50 or inputted signals from the input module 60, and then the microcontroller 10 controls the power supply battery 20 to provide power to the atomizer 30. The atomizer 30 starts working.

If the second timing module 80's timing period is equal to or greater than the presetting period, the microcontroller 10 controls the power supply battery 20 not providing power to the atomizer 30. At this moment, even if the microcontroller 10 receives a detecting signal from the smoking sensor 50 or inputted signals from the input module 60, the microcontroller 10 still control the power supply battery 20 not providing power to the atomizer 30. At same time, the microcontroller 10 controls the prompt module 40 outputting reminding signals; therefore users know the expiration date of the electronic cigarette is passed. The reminding information is outputted by way of voice and/or display. e.g., when the expiration date is passed, to prompt users, a light-emitting diode of the prompt module 40 emits a flicker light or a speaker of the prompt module 40 produces voice.

Figure 5:
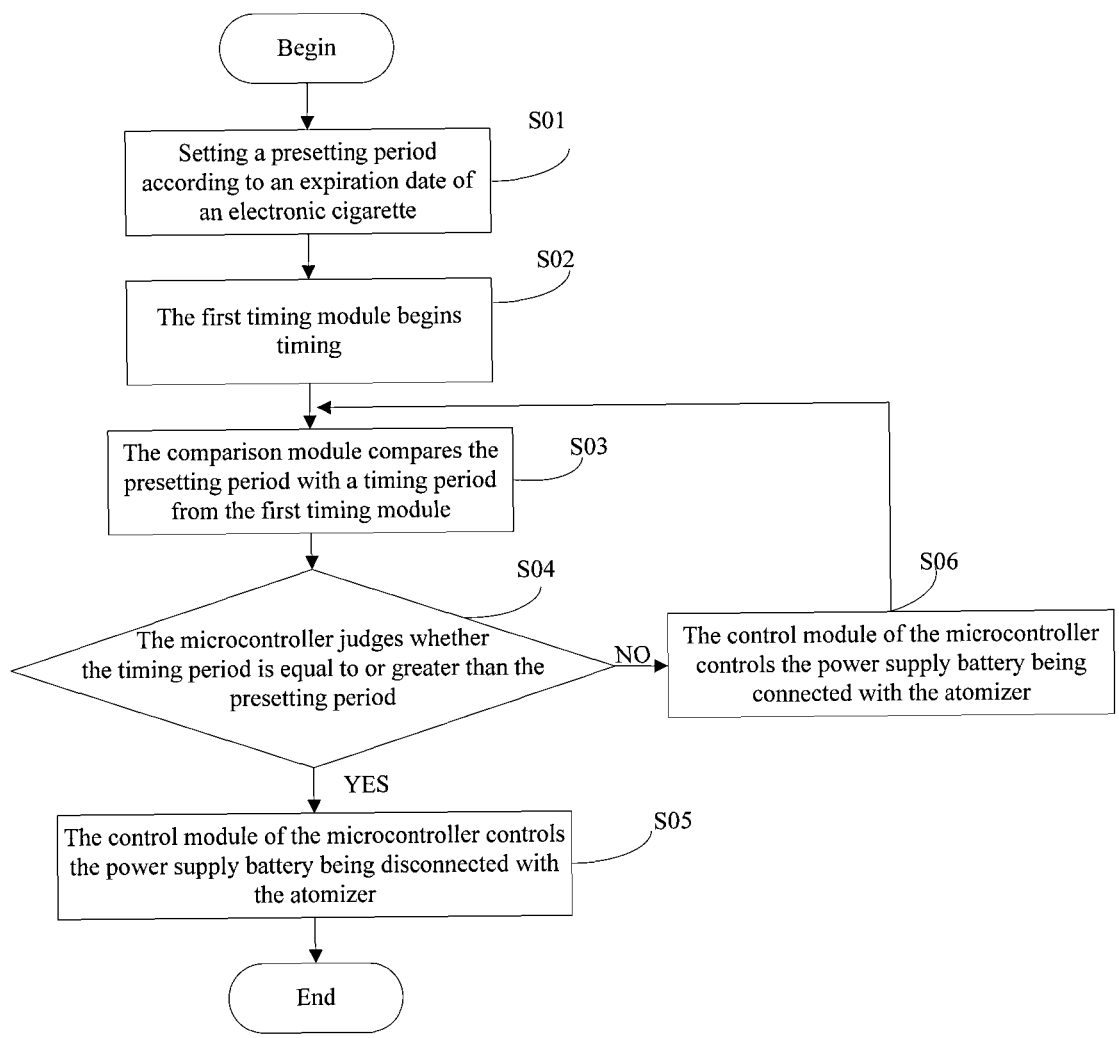
FIG. 5 is the flow chart of a method for detecting expiration date of the electronic cigarette in accordance with the first preferred embodiment of the present invention.

FIG. 5 is the flow chart of a method for detecting expiration date of an electronic cigarette in accordance with a first preferred embodiment of the present invention. In this embodiment, the electronic cigarette comprises a microcontroller, a power supply battery connected with the microcontroller, a prompt module connected with the microcontroller and an input module connected with the microcontroller. The electronic cigarette further comprises atomizer connected with the power supply battery. The microcontroller includes a first timing module, a comparison module, and a control module. The method comprises:

S01. Setting a presetting period according to an expiration date of an electronic cigarette;

S02. The first timing module begins timing;

S03. The comparison module compares the presetting period with a timing period from the first timing module;

S04. The microcontroller judges whether the timing period is equal to or greater than the presetting period, and if yes going to S05, if not going to S06;

S05. The control module of the microcontroller controls the power supply battery being disconnected with the atomizer.

S06. The control module of the microcontroller controls the power supply battery being connected with the atomizer, and going to S03.

At S02, the microcontroller's start timing time is a time of the electronic cigarette production date or a time which users set. Users set it through the input module.

The method for detecting the expiration date of the electronic cigarette of the present invention of the first preferred embodiment further comprises: the microcontroller controls the timing period being outputted and displayed through the prompt module. And when the first timing module's timing period is equal to or greater than the presetting period, the microcontroller controls the prompt module outputs reminding information to users. The prompting information is outputted by way of voice and/or display.

Figure 6:
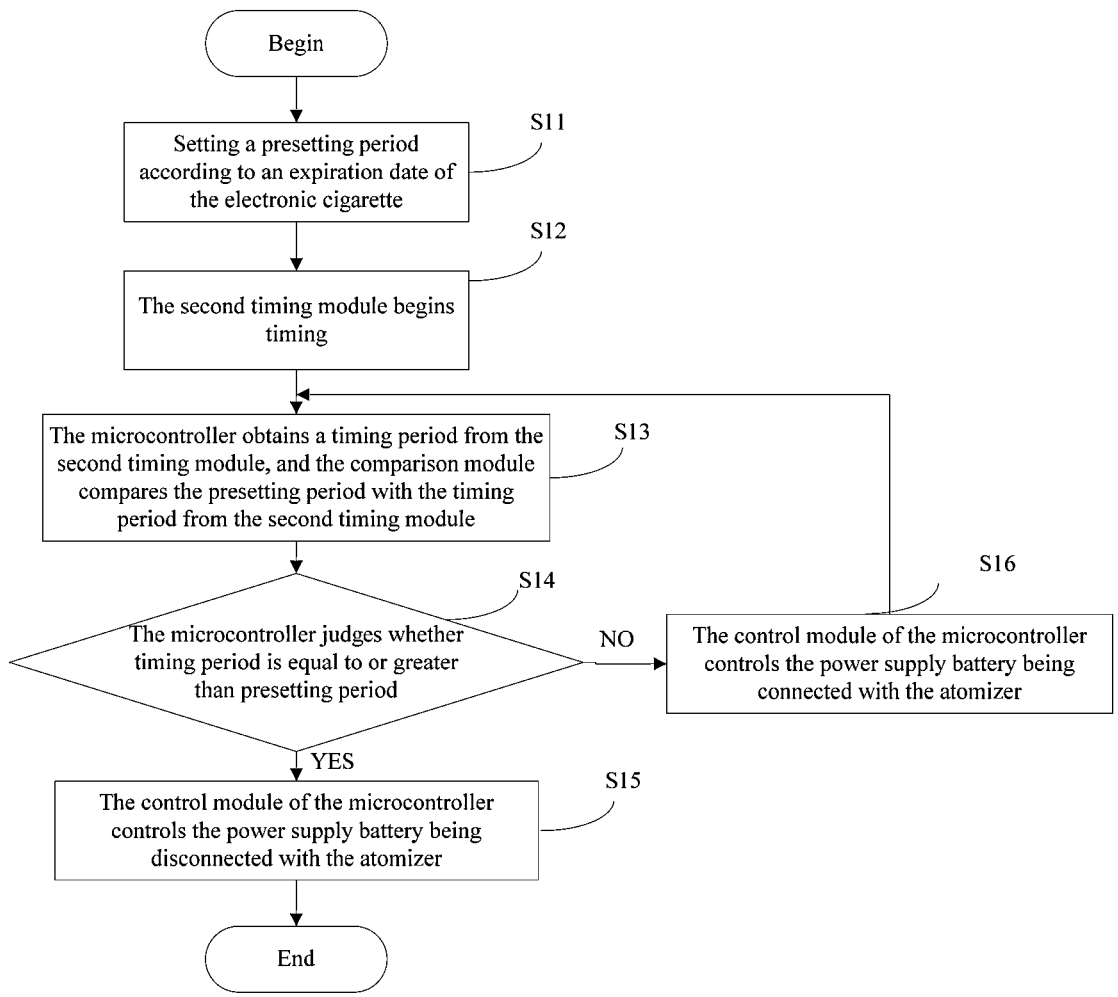
FIG. 6 is the flow chart a method for detecting expiration date of the electronic cigarette in accordance with the second preferred embodiment of the present invention.

FIG. 6 is the flow chart a method for detecting expiration date of an electronic cigarette in accordance with a second preferred embodiment of the present invention. In this embodiment, the electronic cigarette comprises a microcontroller, a second timing module connected with the microcontroller, a power supply battery connected with the microcontroller, a prompt module connected with the microcontroller and an input module connected with the microcontroller. The electronic cigarette also comprises an atomizer connected with the power supply battery. The second timing module is also connected with the power supply battery. The microcontroller includes a comparison module, a control module. The method comprises:

S11. Setting a presetting period according to an expiration date of the electronic cigarette;

S12. The second timing module begins timing;

S13. The microcontroller obtains a timing period from the second timing module, and the comparison module compares the presetting period with the timing period from the second timing module;

S14. The microcontroller judges whether timing period is equal to or greater than presetting period, and if yes going to S15, if not going to S16;

S15. The control module of the microcontroller controls the power supply battery being disconnected with the atomizer;

S16. The control module of the microcontroller controls the power supply battery being connected with the atomizer, and going to S03.

At S12, The microcontroller controls the second timing module to begin timing; the start timing time is a time of the electronic cigarette's production date or a time which users set. Users set it through the input module.

The method for detecting an expiration date of an electronic cigarette of the present invention of the second preferred embodiment further comprises: the microcontroller controls the timing period being outputted and displayed through the prompt module. When the second timing module's timing period is equal to or greater than the presetting period, the microcontroller controls the prompt module outputting reminding information to users. The reminding information is outputted by way of voice and/or display.

To the method for detecting an expiration date of an electronic cigarette of the first and second preferred embodiments of the present invention, if it is applied to electronic cigarettes, the taste of electronic cigarettes can be ensured and the health of users can be ensured.

In the present invention, using a microcontroller's timing function or adding a timing module in an electronic cigarette, and the microcontroller sets a expiration date of the electronic cigarette as a presetting period. When the electronic cigarette is ex-factory, the microcontroller can begin timing and continually count a timing period. If the timing period from the microcontroller or the timing module is passing the presetting period, the electronic cigarette will stop working and stop responding user's smoking action. Through a light emitting diode or a display screen of the prompt module, users can get reminding information that shows the electronic cigarette is passed its expiration date. Therefore, users can avoid smoking overdue electronic cigarettes and feeling uncomfortable when the electronic cigarettes is stored too long, and leads to the taste of liquid smoke changes.

In the embodiment of the present invention, the electronic cigarette can be disposable electronic cigarette or electronic cigarette that can be charged many times and its liquid smoke can be changed. If the electronic cigarette is disposable electronic cigarette, the presetting period can be set according to the expiration date of the electronic cigarette. The start timing time of the first timing module of the microcontroller or the second timing module that is connected with the microcontroller is a time of the electronic cigarette production date. If an electronic cigarette can be charged many times and its liquid smoke can be changed, the start timing time of the microcontroller or the second timing module can be set by users through the input module according to the changing date of the liquid smoke. And the presetting period is also can be set by users through the input module. After users change liquid smoke, the timing begins and the presetting period has been set. And when the timing period is equal to or greater than the presetting period, the power supply battery is disconnected with the atomizer and the prompt module outputs reminding information to users. When users changes liquid smoke again, the timing of the microcontroller or the second timing module is reset and the microcontroller or the second timing module begins timing again.

In the embodiment of the present invention, the power supply of the microcontroller and the second timing module are all provided by the power supply battery. And in order to ensure timing is continuity and accuracy, the power supply can't be cutoff.

Therefore, the present invention is not limited to the pubic specific embodiment, should be comprise all embodiments that fall with the range of claims. Under the teaching of the present invention, skilled in the art can make various changes and equivalents without departing from the scope of the present invention.

What is claimed is:

1. A method for detecting an expiration date of an electronic cigarette, said electronic cigarette comprises a microcontroller, a power supply battery connected with said microcontroller and an atomizer connected with said power supply battery; said microcontroller includes a first timing module, a comparison module and a control module; wherein said method comprising the steps of:
   setting a presetting period according to said expiration date of said electronic cigarette;
   beginning a timing period by said first timing module;
   comparing said presetting period with said timing period from said first timing module by said comparison module;
   when said timing period is equal to or greater than said presetting period, said control module of said microcontroller controls said power supply battery being disconnected with said atomizer;
   wherein a start timing time of said first timing module is a time of an electronic cigarette production date or a time which a user set, said user uses an input module to set said start timing time or a stop timing time, said microcontroller receives a inputted signal from said input module and sets said start timing time and said stop timing time for said first timing module;
   wherein said method further comprises: when said first timing module's timing period is equal to or greater than said presetting period, said microcontroller controls a prompt module to output reminding information to users; said reminding information is outputted by way of voice and/or display;
   wherein said prompt module comprises a LED displayer, a light-emitting diode and a speaker;
   wherein said electronic cigarette comprises a smoking sensor and a switching circuit, and said input module which is connected with said microcontroller, said switching circuit which is connected with said microcontroller, said power supply battery and said atomizer separately;
   wherein said microcontroller is a single-chip microcomputer with a type of Sn8P2711B; said switch circuit includes a MOSFET; a first pin of said microcontroller is connected with a positive of said power supply battery and connected with ground via a filter capacitor; a second pin of said microcontroller is connected with said smoking sensor; a fourth pin of said microcontroller is connected with a grid of said MOSFET; a fifth pin of said microcontroller is connected with said prompt module; a ninth pin of said microcontroller is connected with said input module; a tenth pin of said microcontroller is connected with ground; and
   wherein a source of said MOSFET is connected with ground and a negative of said power supply battery; a drain of said MOSFET is connected with one end of said atomizer; the other end of said atomizer is connected with said positive of said power supply battery.

2. A method for detecting an expiration date of an electronic cigarette, said electronic cigarette comprises a microcontroller, a power supply battery connected with said microcontroller, an input module connected with said microcontroller, an atomizer connected with said power supply battery, and a second timing module which is respectively connected with said microcontroller and said power supply battery; said microcontroller includes a comparison module and a control module; wherein said method comprising the steps of:

when a smoke liquid is replaced, a user sets expiration date of the replacement of the smoke liquid via said input module, a presetting period according to said expiration date of said smoke liquid is set;

said microcontroller controls said second timing module to begin a timing period according to a time which said user set, obtains said timing period from said second timing module and compares said presetting period with said timing period by said comparison module;

when said second timing module's timing period is equal to or greater than said presetting period, said control module of said microcontroller controls said power supply battery being disconnected with said atomizer;

when smoke liquid is replaced again, presetting period and timing period are reset again;

wherein said method further comprises: when said second timing module's timing period is equal to or greater than said presetting period, said microcontroller controls a prompt module outputting reminding information to users; said reminding information is outputted by way of voice and display;

wherein said electronic cigarette comprises a smoking sensor which is connected with said microcontroller, a switching circuit which is connected with said microcontroller, said power supply battery and said atomizer separately;

wherein said microcontroller is a single-chip microcomputer with a type of Sn8P2711B; said switch circuit includes a MOSFET wherein a first pin of said microcontroller is connected with a positive of said power supply battery and connected with ground via a filter capacitor; a second pin of said microcontroller is connected with said smoking sensor; a fourth pin of said microcontroller is connected with a grid of said MOSFET; a fifth pin of said microcontroller is connected with said prompt module; a ninth pin of said microcontroller is connected with said input module; a tenth pin of said microcontroller is connected with ground;

wherein a source of said MOSFET is connected with ground and a negative of said power supply battery; a drain of said MOSFET is connected with one end of said atomizer; the other end of said atomizer is connected with said positive of said power supply battery; and wherein said second timing module is a calcuagraph chip with a type of RX8025.

* * * * *